(12) United States Patent
Ito

(10) Patent No.: US 7,039,811 B2
(45) Date of Patent: May 2, 2006

(54) APPARATUS AND METHOD FOR CONTROLLING ACCESS TO CONTENTS STORED IN CARD LIKE ELECTRONIC EQUIPMENT

(75) Inventor: Takafumi Ito, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 882 days.

(21) Appl. No.: 09/796,592

(22) Filed: Mar. 2, 2001

(65) Prior Publication Data

US 2001/0020271 A1    Sep. 6, 2001

(30) Foreign Application Priority Data

Mar. 3, 2000    (JP) ............................ P2000-058527

(51) Int. Cl.
*H04K 1/00* (2006.01)
*H04L 9/00* (2006.01)

(52) U.S. Cl. .................. 713/185; 713/189; 713/193; 713/502; 726/16; 726/17; 726/20; 726/21; 711/163

(58) Field of Classification Search ............... 713/185, 713/168, 170, 169, 193, 300, 340, 189, 200, 713/202, 502; 235/380, 375; 705/52, 51; 726/16, 17, 20, 21; 711/163
See application file for complete search history.

(56) References Cited

U.S. PATENT DOCUMENTS

| | | | | |
|---|---|---|---|---|
| 5,293,424 | A | * | 3/1994 | Holtey et al. ............... 713/193 |
| 5,546,589 | A | * | 8/1996 | Odaira ....................... 713/340 |
| 5,857,020 | A | * | 1/1999 | Peterson, Jr. ................ 705/52 |
| 5,857,024 | A | * | 1/1999 | Nishino et al. ............. 713/172 |
| 5,963,980 | A |   | 10/1999 | Coulier et al. |
| 6,094,724 | A | * | 7/2000 | Benhammou et al. ...... 713/202 |
| 6,213,392 | B1 | * | 4/2001 | Zuppicich .................. 235/380 |
| 6,480,869 | B1 | * | 11/2002 | Fujioka ...................... 708/252 |

OTHER PUBLICATIONS

U.S. Appl. No. 09/748,855, filed Dec. 28, 2000, to Ito et al.
U.S. Appl. No. 09/748,856, filed Dec. 28, 2000, to Ito et al.
U.S. Appl. No. 09/748,857, filed Dec. 28, 2000, to Ito.

* cited by examiner

*Primary Examiner*—Hosuk Song
*Assistant Examiner*—Beemnet W Dada
(74) *Attorney, Agent, or Firm*—Finnegan, Henderson, Farabow, Garrett, & Dunner, L.L.P.

(57) ABSTRACT

Card like electronic equipment, such as a security digital (SD) memory card, includes a CPU, a real time clock (RTC) for counting time data; a FLASH ROM for storing the time data read out from the RTC into a covered RAM area of the ROM; and a lithium ion battery for supplying driving power to the RTC even when the SD memory card is not connected to a host personal computer, in order to enhance security of the contents data, e.g. copyright, protected by the CPU in the SD memory card.

7 Claims, 5 Drawing Sheets

Fig. 5A
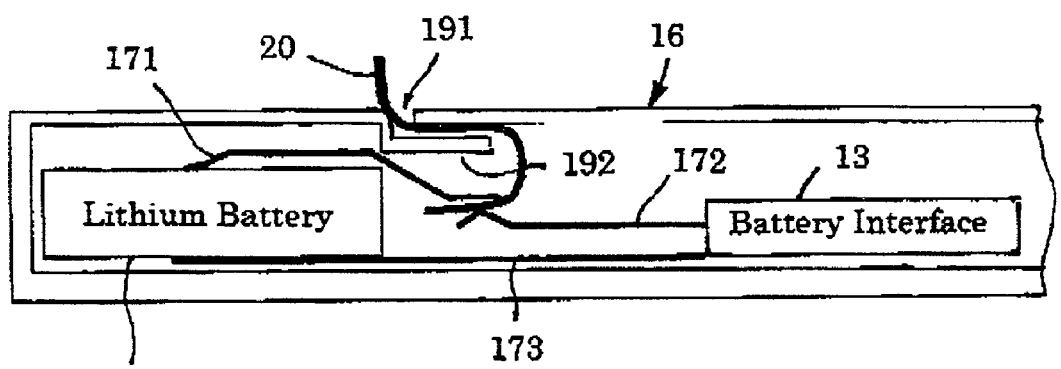
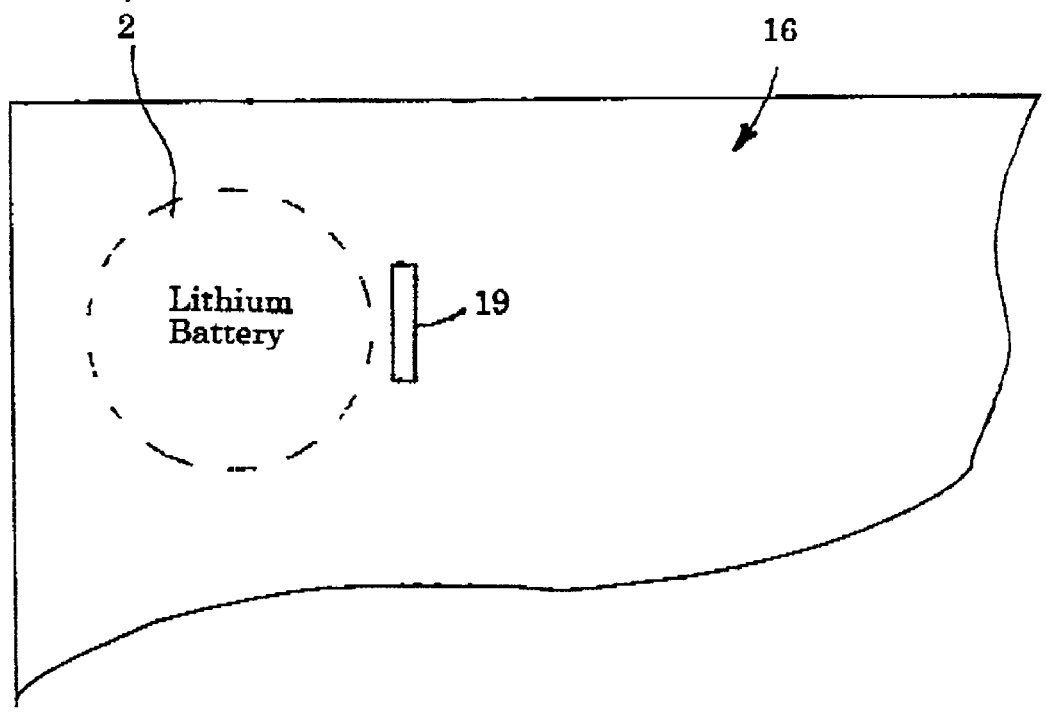
Fig. 5B

APPARATUS AND METHOD FOR CONTROLLING ACCESS TO CONTENTS STORED IN CARD LIKE ELECTRONIC EQUIPMENT

This application claims priority benefits based on Japanese Patent Application No. P2000-058527, filed Mar. 3, 2000, the entire contents of which are fully incorporated herein by reference.

BACKGROUND OF THE INVENTION

1. Field of the Invention

The present invention relates to card like electronic equipment or device that is detachably connectable to host equipment, such as a personal computer, and more particularly, to an apparatus and method for controlling access to contents protected by, for example, copyright, or kept in secrecy, and stored in the card like electronic equipment, such as an IC memory card.

2. Discussion of the Related Art

Typically, detachable card like electronic equipment, such as an IC memory card, is used to store and reproduce contents data to a host data processing device, such as a personal computer (PC) in order to transmit or receive the contents data protected by, for example, copyright, along with keeping security protection.

In general, the IC memory card includes a central processing unit (CPU) for controlling operations in the IC memory card, a read only memory (ROM) for storing identification (ID) for permitting the usage of the IC memory card, a random access memory (RAM) for storing a password for permitting access to the contents data in the IC memory card, and a clock for providing time data in the IC memory card.

Usually, in order to maintain the protection of a right or the security of contents data, it is possible for the password to designate a limited permission period, e.g., an expiration time, for using the contents in the IC memory card. For increasing the security of the protected contents, conventionally, the usage of the password is controlled by time data provided from the built-in clock in the IC memory card. Thus, when the password is stored in the IC memory card, in general, both the registration date or the renewal date of the password and an expiration date for permission of the password are preliminarily designated in host equipment, such as a personal computer (PC).

When the IC memory card is installed in the host equipment, e.g., a PC, an interrupt process in the IC memory card detects a present time by reading the time data counted in the clock at predetermined time intervals. Further, both of a previous renewal time of the password and a registered time of the password are read out. The detected present time is compared to the read out renewal time.

If the present time has exceeded the designated time period of the renewal time of the password, the usage of the password is no longer permitted since the password has already expired relative to the designated permission time period. Accordingly, a warning regarding expiration of the permission for the password is, for example, displayed on the PC.

However, in the conventional IC memory card system, there is no measurement for protecting the password data or the altering of the time data. Thus, there is no protection for keeping the security of the password data itself, nor for time data that is provided from the built-in clock in the IC memory card. As explained above, in the conventional IC memory card, the password is stored in the RAM. Usually, the password is read out by executing an enciphered program that is stored in the ROM in the IC memory card. Accordingly, if the enciphered program in the ROM has unlawfully been accessed, it becomes possible to easily acquire or steal the password data stored in the IC memory card system.

Further, it is intentionally possible to alter the time data of the clock itself for extending the limited time period. Thus, by unlawfully altering the time of the clock, it becomes possible to change the renewal time for the password.

Such unlawful altering of the time data in the IC memory card generates further problems. Usually, the IC memory card stores application software for trial use or music data as the contents, in order to permit usage of the software along with permitting a certain limited time period. In spite of the permission of the limited period, it is possible to illegally extend the limited period of the trial use of the application software or music data by altering the time data of the clock in the IC memory card. Since music data is usually protected by copyright, such an illegal usage of the contents data in the IC memory card produce serious problems.

SUMMARY OF THE INVENTION

Therefore, there is a need for a device and method for controlling reliable access to protected contents stored in card like electronic equipment in order to maintain a high grade of security for the contents.

Card like electronic equipment and method for controlling access to the contents stored in the card like electronic equipment according to the present invention solves the aforementioned problems and defects that are present in the conventional card like electronic equipment.

In accordance with the present invention there is provided a card like electronic device that is detachably connectable to a data processing device, comprising: a timer circuit for counting time data; a control unit for accessing the timer circuit to read the time data; and a nonvolatile memory, including a covered area that can be accessed by the control unit, for storing the time data read by the control unit or control data generated by the control unit based on the time.

Also in accordance with the present invention, there is provided detachable card like electronic equipment for coupling to host equipment, comprising: a control unit; a timer circuit, accessed by the control unit, for counting time data; a nonvolatile memory, including a covered area and accessed by the control unit only, for storing time data read out from the timer circuit or control data generated by the control unit based on the time data, the covered area only being accessible by the control unit; and a backup power source coupled to the timer circuit, for supplying a driving power source to the timer circuit when the card like electronic equipment is not coupled to the data processing device.

Further in accordance with the present invention there is provided card like electronic equipment that is detachable to a data processing device, according to the present invention, comprising: a card like body; a timer circuit provided in the body; a backup power source provided in the card body; and a conducting control mechanism that prohibits a change of a current-carrying state, between the backup power source and the timer circuit, to a non-current carrying state after the current-carrying state is established.

Additionally in accordance with the present invention, there is provided card like electronic equipment that is detachably connectable to a data processing device, comprising: a CPU; a timer circuit for counting time data, wherein only the CPU can access the timer circuit; a backup power source for supplying a driving power source to the timer circuit when the card like electronic equipment is not connected to the data processing device; and a nonvolatile memory for storing a state of designation of the time data in the timer circuit.

Further in accordance with the present invention there is provided a method for controlling access to digital contents stored in card like electronic equipment that includes a control unit; a timer circuit, accessed by the control unit, for counting time data; and a nonvolatile memory having a covered area, the control unit having access to the covered area, the method comprising the steps of: receiving a request from a data processing device for recording contents that have limited use during a specified time period; reading out the time data in the timer circuit by the control unit when the request for recording is received; and storing the read out time data and the specified time period in the covered area of the nonvolatile memory.

BRIEF DESCRIPTION OF THE DRAWINGS

A more complete appreciation of the present invention and many of the attendant advantages will be realized as the same becomes better understood by reference to the following detailed description when considered in connection with the accompanying drawings in which like reference numerals designate identical or corresponding parts throughout the several views.

FIG. 5A is a partially cut-off cross-sectional view of the SD memory card for explaining operations of the lithium ion battery in the SD memory card.

FIG. 5B is a partially cut-off plain view of the SD memory card shown in FIG. 5A.

DESCRIPTION OF THE PREFERRED EMBODIMENTS

Reference will now be made in detail to the preferred embodiments of the present invention examples which are illustrated in the accompanying drawings.

Embodiments consistent with the present invention comprise a novel card like electronic equipment detachable to host equipment and apparatus and a method for reliably controlling a permitted access period to the protected contents along with preventing the time data from being altered in order to enhance the protection right of the stored contents.

Embodiments consistent with the present invention also comprise a novel apparatus and method for externally accessing card like electronic equipment while preventing the time data in the card like electronic equipment from being altered. For example, only a control unit of the card like electronic equipment is permitted to access the time data in order to enhance security.

Embodiments consistent with the present invention also enhance the security of the contents data by storing the contents data in the card like electronic equipment after enciphering the data with time data that is impossible to alter.

Embodiments consistent with the present invention further comprise a method for controlling access to digital contents stored in a card like electronic equipment in order to enhance the security by preventing time data from altering.

Figure 1:
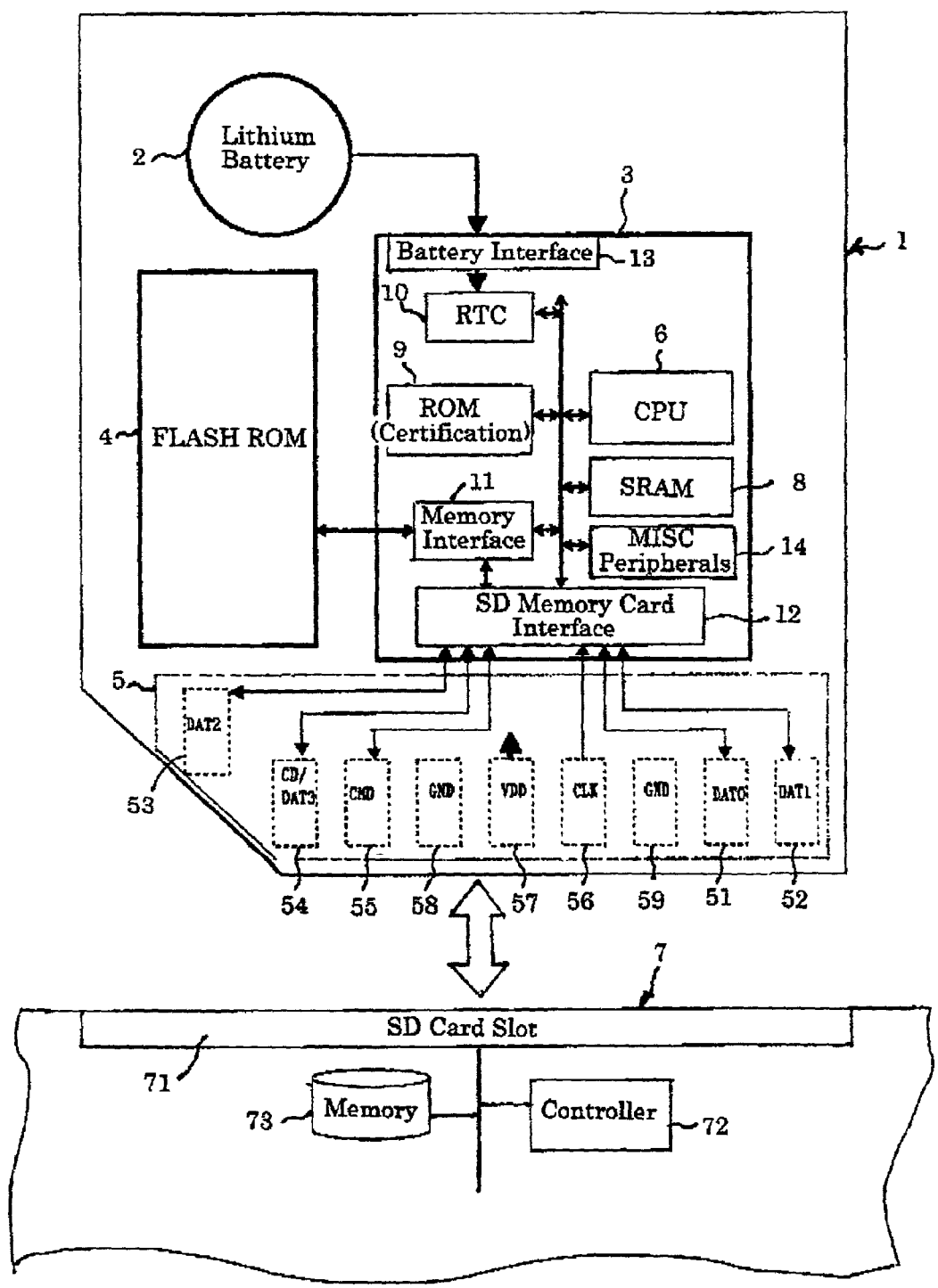
FIG. 1 illustrates a block diagram of components of a detachable security digital (SD) card, consistent with the present invention.

FIG. 1 illustrates components of an IC card, i.e., security digital (SD) memory card 1, consistent with the invention. The SD memory card 1 of this embodiment includes a real time clock (RTC) 10 for achieving a timer function in the SD memory card. The RTC 10 for the SD memory card 1 is applied in a manner similar to the application of an RTC in a personal computer (PC). The electric power source for driving the RTC 10 in the SD memory card 1 is supplied from a lithium battery 2 that is built into the SD memory card 1. When the SD memory card 1 is detached from host equipment, the lithium battery 2 supplies power voltage to the RTC 10 in order to achieve various security controls for the contents data stored in the SD memory card 1.

As illustrated in FIG. 1, the SD memory card 1 also includes an SD memory card interface controller 3 for controlling operations in the SD memory card 1; and a FLASH ROM 4 for storing the contents data such as real data of music contents. The SD memory card interface controller 3 includes a battery interface 13 for supplying power to the real time clock (RTC) 10 when the RTC 10 cannot receive power from host equipment 7, such as a personal computer (PC).

Further, the SD memory card interface controller 3 includes a CPU 6 for controlling operations in the SD memory card 1; an SRAM 8 for executing a certification process in order to determine the legitimacy of accesses to the SD memory card 1; a ROM 9 for storing a program of the certification process; a memory interface 11 for accessing the FLASH ROM 4; an SD memory card interface 12 that includes a plurality of connectors 51–59 for coupling to corresponding terminals (not shown) provided in a slot of a host equipment 7, such as a personal computer (PC), and a MISC circuit for peripheral devices. These elements of the SD memory card interface controller 3 are provided as a single chip LSI.

As explained above, the CPU 6 in the SD memory card interface controller 3 controls all operations in the SD memory card 1. When the SD memory card 1 is installed into the host equipment 7, such as a personal computer (PC), through an SD card slot 71, a controller 72 of the host PC 7 sends a command to the SD memory card 1 requesting access to the flash memory 4 in the SD memory card 1 in order to record or reproduce contents data. The CPU 6 of the SD memory card interface controller 3 controls the requested access.

In order to maintain security protection for the contents in the FLASH ROM 4, the CPU 6 executes a particular enciphered procedure before permitting access requested by the commands from the host PC 7. Thus, by using enciphered protocol, such as an open enciphered key or a common enciphered key, the CPU 6 in the SD memory card 1 executes the certification process. As a result of the certification, if both the host PC 7 and the SD memory card 1 are judged as authorized devices, the CPU 6 permits the access requested by commands from the host PC 7.

The SRAM 8 in the SD memory card 1 is a work buffer memory for executing calculations for the certification process by the CPU 6. Only the CPU 6 in the SD memory card interface controller 3 can access the SRAM 8. In other words, it is not possible for devices other than the CPU 6 to access the SRAM 8 for executing the certification process under the control program stored in the ROM 9.

The RTC 10 in the SD memory card interface controller 3 counts the time based on the clock pulses of a predetermined clock oscillator. For example, the RTC 10 can count up at a second unit level for using security control. Thus, the time should be counted in units of year/month/hour/minutes/seconds.

Further, the CPU 6 can read out the time data in the RTC 10. Also, the CPU 6 can designate the time data for the RTC 10.

As explained above, when the SD memory card 1 receives an accessing request for transmitting data from the host PC 7, it is always allowed access to the SD memory card 1 only when the CPU 6 has completed the certification process stored in the ROM by calculating in the work buffer of the SRAM 8.

The memory interface circuit 11 in the SD memory card interface controller 3 controls transmission/reception of data between the CPU 6 and the FLASH ROM 4. For example, the memory interface circuit 11 in the SD memory card interface controller 3 executes address conversion procedures based on commands supplied from the CPU 6 in the SD memory card interface controller 3.

The SD memory card interface 12 controls transmission/reception of data between the host PC 7 and the SD memory card 1. When the SD memory card 1 is installed in the SD memory card slot 71 of the host equipment PC 7, the SD memory card interface 12 is coupled to the respective corresponding terminals in the SD memory card slot 71 through a plurality of terminals of data terminals DAT0 (51), DAT1 (52), DAT2 (53) and CD/DAT3 (54), a command terminal (CML) (55), a clock terminal (CLK) (56) for respectively transmitting/receiving commands, data or clock to or from the controller 72 or the memory 73 in the host equipment, e.g. PC 7, VDD (57) and grounding terminals (GND) (58)–(59).

The battery interface 13 in the SD memory card interface controller 3 supplies source voltage from the lithium battery 2 to the RTC 10 in the SD memory card interface controller 3.

Figure 2:
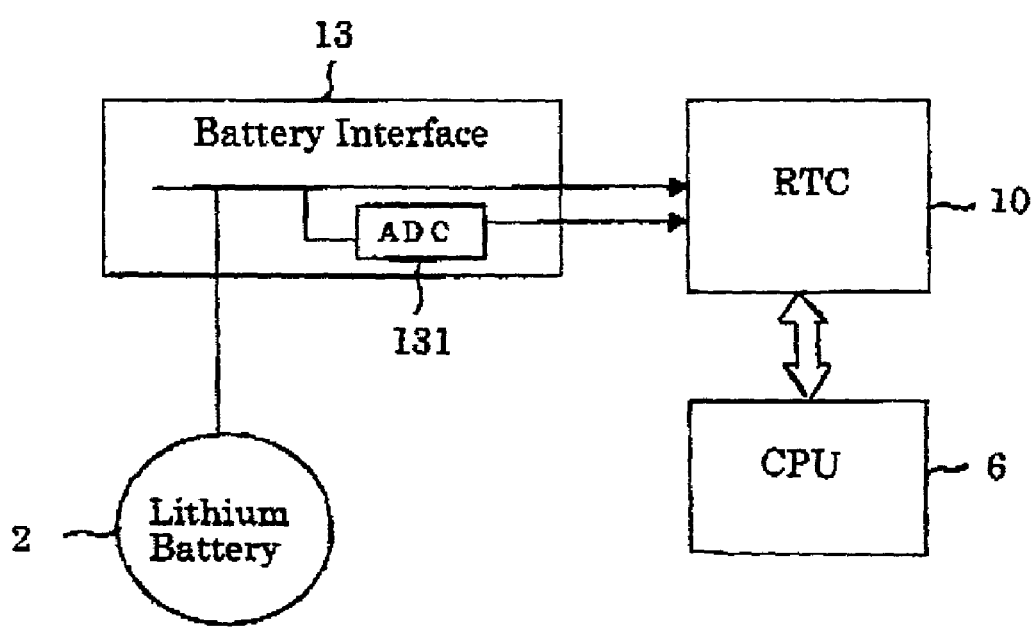
FIG. 2 illustrates a battery voltage detecting mechanism for a real time clock (RTC) in the block diagram shown in FIG. 1.

As illustrated in FIG. 2, the battery interface 13 includes an analog/digital converter (ADC) 131 for detecting residual capacity, i.e., a voltage level of the lithium battery 2. When the residual capacity, falls below a predetermined value, the ADC 131 transmits warning information to the CPU 6 in the SD memory card interface controller 3.

When the SD memory card 1 cannot receive an electric power supply from the host equipment, e.g., PC 7, the lithium battery 2 supplies electric power to the RTC 10 in the SD memory card interface controller 3. On the other hand, each of the circuits in the SD memory card 1 installed in the SD card slot 71 of the host PC 7, including the RTC 10, receives an electric power supply from the host equipment PC 7 through the power supply terminal (VDD) 56 in the connector terminal 5 provided on the SD memory card 1.

Thus, when the SD memory card is not installed into the host equipment PC 7, it becomes possible for the RTC 10 in the SD memory card interface controller 3 to continuously count the time data since the lithium battery 2 supplies electric power to the RTC 10 during the detachment from the host equipment PC 7.

For example, the lithium battery 2 with a thickness of approximately 1–2 mm and a diameter of approximately 3 mm, can be used for the SD memory card 1. Electric power can be supplied from the battery to the RTC 10 for approximately 5 years in order to achieve its time counting function.

The MISC circuit 14 detects the connection status between the SD memory card 1 and the host equipment PC 7. If the connection status detects that the SD memory card 1 is not connected to the host equipment PC 7, the MISC circuit 14 sends an instruction to the lithium battery 2 to supply electric power to the RTC 10. The connection status between the SD memory card 1 and the host equipment PC 7 can be detected by receiving a card detecting signal that is transmitted through the CD/DAT 3 terminal 54 in the connector 5. Thus, the MISC circuit 14 can detect the card connection status and determine the type of card in the connection.

The FLASH ROM 4 is a nonvolatile memory that can record or reproduce data and keep the contents data stored without a supply of electric power. Thus, FLASH ROM 4 stores the real data, for example, contents protected by copyright, such as music, an enciphered key for controlling to record or reproduce the contents, and various identifications (IDs) for using various certification procedures between the host equipment PC 7 and the SD Memory card 1.

Figure 3:
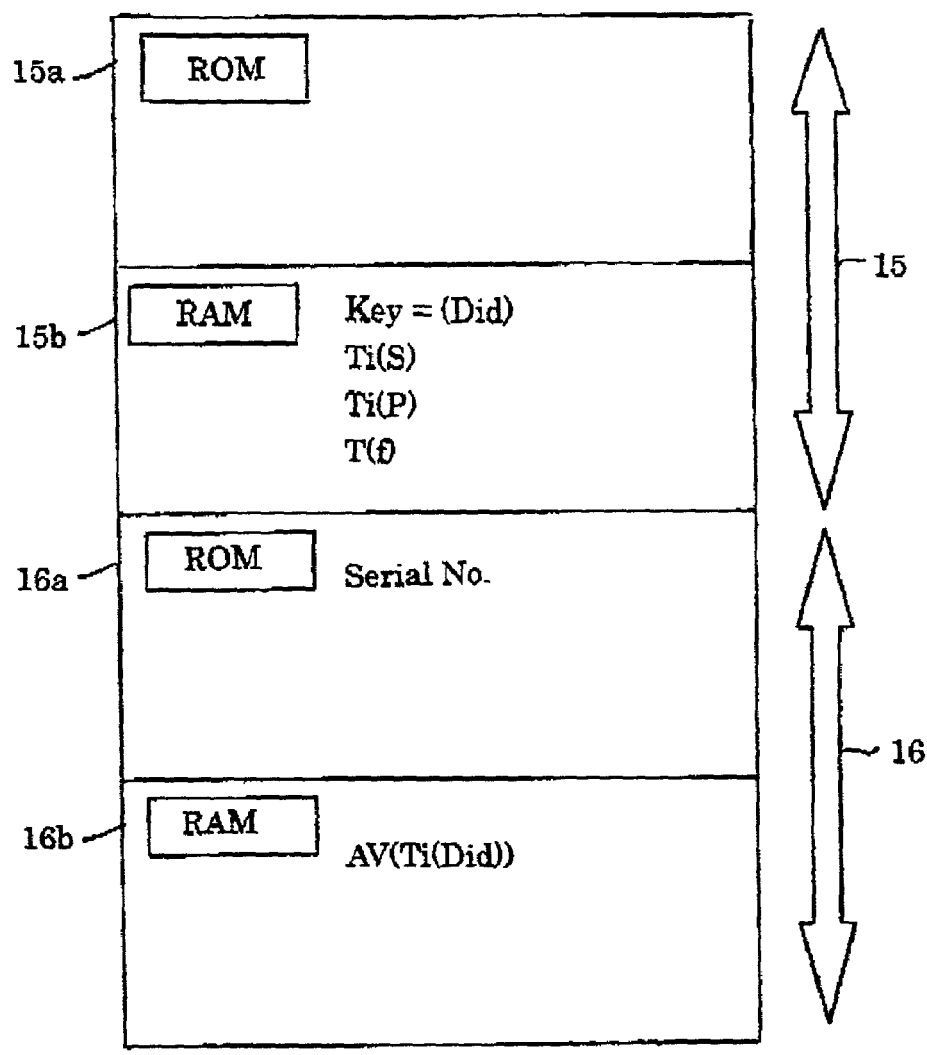
FIG. 3 illustrates an inner construction of a FLASH ROM in the block diagram shown in FIG. 1.

FIG. 3 illustrates the construction of the FLASH ROM 4. The FLASH ROM 4 includes a covered area 15 and an open area 16. Only when the certification process between the host equipment PC 7 and the SD memory card 1 has succeeded, can the CPU access the covered area 15 in the FLASH ROM 4.

Further, the covered area 15 includes a covered ROM area 15a and a covered RAM area 15b. The covered ROM area 15a stores a device identification (Did) that is peculiar to the SD memory card 1. It is impossible to rewrite the stored device ID (Did) in the covered RAM area 15b. The covered RAM area 15b stores the device ID (Did) as an enciphered key. Only by using the enciphered key, can the host equipment PC 7 reproduce the recorded contents. The access to the enciphered key can only be allowed when the certification process between the host PC 7 and the SD memory card 1 has succeeded. In the covered RAM area 15b, as explained below, data storing time information Ti(S), a limited permission period for using contents data Ti(P) and a time designating flag T(f) are also stored.

The open area 16 in the Flash ROM 4 includes an open ROM area 16a for storing information, such as a manufacturing serial number of the SD memory card 1. It is possible for the host equipment PC 7 to access the open ROM area 16a without successfully completing the certification procedure.

The open RAM area 16b stores contents that are recorded from the host equipment PC 7. Since the contents data are enciphered by the enciphered key, it is impossible to decode or reproduce it without succeeding to read out the enciphered key in the certification process.

The method for controlling access to the enciphered contents in the invention executes the following operations based on the above-mentioned structures.

An example of recording/reproducing of the contents is described next.

In order to record contents that are to be kept secure, such as music information, into the Flash ROM 4 in the SD memory card 1 from the host equipment PC 7, the CPU 6 first performs the certification process between the SD memory card 1 and the PC 7. If the certification procedure succeeds, the PC 7 can be allowed to access data in the FLASH ROM 4 of the SD memory card 1.

Simultaneously, the CPU 6 generates an enciphered key for enciphering the contents by a predetermined calculation. The generated enciphered key Ti(Did) is transferred to the host equipment PC 7. The host equipment PC 7 sends an instruction to the CPU 6 in the SD memory card 1 for enciphering the contents by using the transferred enciphered key and for storing the enciphered contents into the open RAM area 16*a* in the FLASH ROM 4. By receiving the instruction, the CPU 6 stores the received contents and the enciphered key in the covered RAM area 15*b* to maintain security.

The CPU 6 generates the enciphered key by using the time information counted by the RTC 10, to which the CPU 6 can only access, during the control of the enciphered key generation by the certification process.

Figure 4:
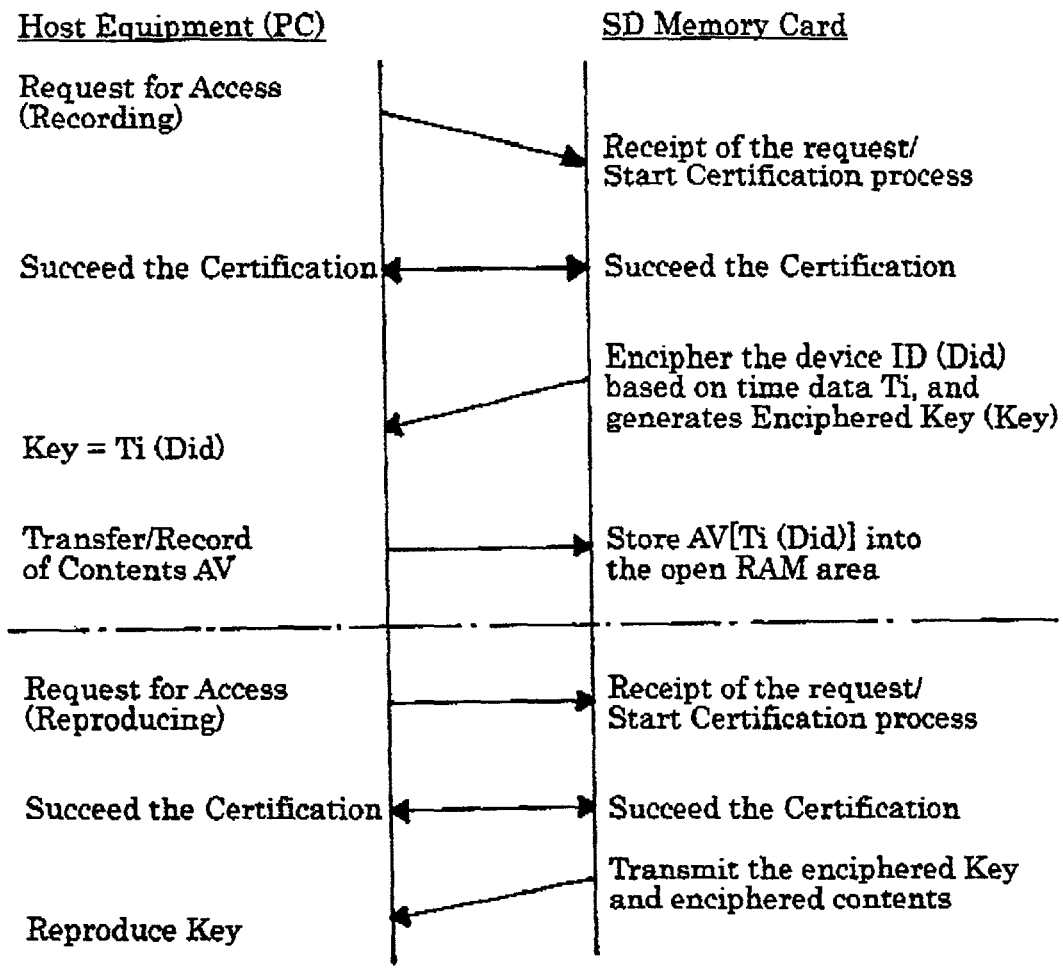
FIG. 4 is a flow chart showing transmitting/receiving processes of commands or data between host equipment e.g., a personal computer (PC) and a security digital (SD) memory card.

FIG. 4 explains the procedures of various requests for data and replies to the requests between the host equipment PC 7 and the SD memory card 1.

a) The host PC 7 sends a request for recording (accessing) data to the SD memory card 1. When the request is received, the CPU 6 in the SD memory card 1 and the controller 72 in the host equipment PC 7 execute the certification process based on a specified procedure between the SD memory card 1 and the host equipment PC 7.

b) When both the SD memory card 1 and the host equipment PC 7 determine they are the to correct devices for accessing the certification process, the CPU 6 in the SD memory card 1 reads out the time data (Ti) counted by the RTC 10.

c) Simultaneously, the CPU 6 reads out the device ID (Did) from the covered ROM area 15*a* in the FLASH ROM 4 and generates the enciphered key by enciphering the data Ti by using the device ID (Did). The CPU 6 transmits the enciphered key [Ti(Did)] to the host equipment PC 7. Further, the CPU 6 stores the enciphered key [Ti (Did)] to the covered RAM 15*b* in the FLASH ROM 4.

d) The host equipment PC 7 enciphers the contents AV by using the received enciphered key [Ti(Did)] and generates the enciphered contents AV that is represented as an AV [Ti (Did)]. The enciphered contents AV [Ti (Did)] is transmitted to the SD memory card 1 for storing the enciphered contents in the open RAM area in the FLASH ROM. The SD memory card 1 completes the data storing procedure by storing the enciphered contents AV [Ti (Did)] in the open RAM area.

e) In the case of reproducing the stored contents, similar to the data recording process, the host equipment PC 7 sends an access request for reproducing the stored contents to the SD memory card 1. After judging both of the host equipment PC 7 and the SD memory card 1 as the correct devices for the certification process, the SD memory card 1 transmits the enciphered key and the contents AV to the host equipment PC 7.

Thus, with further enciphering, the CPU 6 transmits the contents AV [Ti(Did)] stored in the open RAM area 16*a* and the enciphered key [Ti (Did)] stored in the covered RAM area 15*b* by using the device ID for the PC 7 in order to decode and reproduce.

As described above, the time data counted by the RTC 10 is used for generating the enciphered key in order to store the data contents. Consequently, since it becomes possible to enhance the quality of a random number, it becomes possible to enhance the protecting function for maintaining the security protection. Further, since it is possible only for the CPU 6 in the SD memory card 1 to access the time data in the RTC 10, it is impossible to read the time data from outside the card 1. Consequently, the process can prevent unlawful access.

An example of storing the contents and the time control for accessing the contents is described next.

The following explains the procedure for suitably managing the trial use or hearing stored contents that have an established time limit for usage:

a) In order to store contents having a time limit for use in the SD memory card 1, the host equipment PC 7 sends a recording instruction to the SD memory card 1 that the contents have a certain time limit for use.

b) Based on the recording request from the host equipment PC 7, the CPU 6 in the SD memory card 1 stores to the covered RAM area 15*b* the following data associated with the stored contents:

The enciphered key information for the contents: Key= (Did)

The stored time data read out from the RTC: Ti (S)

The permission period for usage limited by the PC 7: Ti (P)

The time designating flag: T(f)

c) When the host PC 7 sends an instruction for reading out the stored contents, at first, the CPU 6 in the SD memory card 1 determines time difference information Ti(D) between the stored time information Ti(S) and the present time information Ti(R) that is read out from the RTC 10.

d) Then, the CPU 6 compares the acquired time difference information Ti(D) with the usage time limit information Ti(P). If the time difference information Ti(D) exceeds the usage time limit information Ti(P), the CPU 6 rejects the access request from the host equipment PC 7 by determining that the period for use has already expired.

Since all of the acquisitions of the time information are performed by the CPU 6 in the SD memory card 1 from the RTC 10 in the SD memory card 1 and the covered RAM area 15*b*, it is impossible to alter the time information through the host PC 7 from instructions of a user. Consequently, it becomes possible to properly control the contents, such as music or application software, by keeping a time limit for the storage.

An example of processing in a case of exhaustion of the lithium battery is described next.

As explained above, all of the controls for usage durations of the contents are based on the time data of the RTC 10 in the SD memory card 1. Consequently, if the lithium battery, from driving the RTC 10, has run down, it becomes impossible to execute an appropriate control for maintaining the security since the CPU 6 cannot read out the time from the RTC 10.

For avoiding the possibility, if the lithium battery runs down, the following processes are executed:

a) When the battery interface 13 detects that the lithium battery 2 is running down, the battery interface 13 transmits information relating to the running down of the battery to the CPU 6.

b) After the CPU 6 receives the battery running down information once, the CPU 6 rejects access even when the PC 7 sends requests for recording or reading such as explained in (1) above.

c) If the PC 7 sends another type of request order other than the recording or reading out, such as explained in the (1) above, the CPU 6 permits access after the normal certification process in order to control the recording or reading out of the contents data.

Thus, when the lithium battery 2 in the SD memory card 1 has run down, it becomes possible to reject access for recording or reproducing contents that require the time data information. Accordingly, it can prevent other data from erroneously accessing the contents by unauthorized reading out of the time data of the RTC 10 due to a malfunction. Even when the battery has run down, it is possible to use the SD memory card for normal operation, since it is possible to access normal data that do not require the time data.

An example of designating the time data of the RTC 10 is described next.

After the time data of the RTC 10 in the SD memory card 1 has been designated, it is impossible for a user to change or alter the time data. The following explains the structure and procedure related to this feature.

As illustrated in FIG. 5A, the SD memory card 1 includes the lithium battery 2 in its body 16. An upper surface of the lithium battery 2 has contact with a first battery electrode 171. The first electrode 171 is coupled to one terminal of the battery interface 13 through a second electrode 172. The lower surface of the lithium battery 2 is connected to another terminal of the battery interface 13 through a third electrode 173. The power source from the lithium battery 2 is supplied to the RTC 10 (FIG. 1) through the battery interface 13.

As shown in FIGS. 5A and 5B, on the surface body 16 of the SD memory card, a slit portion 19 is provided for inserting an insulating film member 20. Provided on the surface body, the slit portion 19 is comprised of a notch 191 and a guiding plate 192 that is connected to the notch 191 for constructing a guiding path under the surface. Thus, the notch 191 and the guiding plate 192 form a slit guiding path for guiding the insertion direction for the insulating film member 20.

In the manufacturing stage, the insulating film member 20 is inserted through the slit 19 in order to cut off electric conduction between the first battery electrode 171 and the second battery electrode 172. Thus, one end portion of the insulating film member 20 is inserted between the first and the second electrodes in order to disconnect the battery 2 and the RTC 10, while the other end of the insulating film member 20 projects from the slit 19 of the completely assembled SD memory card.

A designation of time data in the RTC 10 in the SD memory card 1 and the time counting process of the RTC 10 are executed according to the following procedures.

a) At an initial stage of delivery from a manufacturer, as shown in FIG. 5A, provided on the surface of the SD memory card 1, the insulating film member 20 is inserted between the first electrode 171 and the second electrode 172 passing through the slit portion 19 in order to block electrode contact between the lithium battery 2 and the battery interface 13. Thus, at the initial stage, i.e., at a shipping stage, the RTC 10 does not begin to count time data. Further, a time designating flag T (f) in the covered RAM area 15b of the FLASH ROM 3 maintains an un-designating state "0".

b) When a user intends to use the SD memory card 1, the insulating film 20 is pulled out in order to provide conduction between the lithium battery 2 and the battery interface 13 through the second electrode 172. After the insulating film member 20 has been pulled out from the slit portion 19 of the SD memory card 1, it is impossible for the user to re-insert the insulating film member 20 through the slit guiding portion between the first electrode 171 and the second electrode 172. The connecting portion between the first electrode 171 and the second electrode 172 is located beneath the guiding plate 192. Thus, it is impossible to return back to the initial stage, i.e., a disconnected state for the battery, since it is impossible to curve the film member 20 again in the SD memory card body after re-inserting it along the guiding plate 192.

c) After achieving conduction between the lithium battery 2 and the battery interface 13 through the electrodes, the SD memory card 1 is installed into a SD memory card slot 71 (FIG. 1) in order to execute the time designating process for the RTC 10.

d) When the SD memory card 1 is installed in the host PC 7, the controller in the PC 7 executes a certification process for the SD memory card. After the certification process, the controller judges whether or not the time designating flag T (f), in the SD memory card 1, indicates the un-designated state "0".

e) If the time designating flag T(f) indicates the un-designated state "0", the host PC sends a request to the CPU 6 in the SD memory card 1 for setting a present time in a time designating register in the RTC 10. When the CPU 6 sets the time designating flag T(f) to "1", the time designation is completed. The present time is designated by, for example, utilizing the time data of the timer provided in the host PC side or by directly inputting the present time II through a keyboard.

By controlling the time designation, it becomes possible to prevent the battery from running down before the initial use of the SD memory card 1. Further, it becomes impossible to alter the time data in order to unfairly extend the limited time by returning to the non-conductive state of the battery.

Thus, the time designation for the RTC in the SD memory card is limited to one initial use. This prevents time data from being designated again. Even when the designated time generates a lag during a long time usage, there is no problem for using the time data to control data for the permitted usage period since the time data in the RTC is commonly used for counting the storage period of the contents and reading time of the contents data.

When the time designating flag T(f) that is explained above indicates the un-designated state "0", the CPU in the SD memory card rejects a request from the host PC 7 for storing time designating control data or for reading the contents. Thus, the CPU in the SD memory card prevents the host PC from accessing information that needs the time data. Consequently, it can achieve complete protection of contents data by avoiding an inappropriate designation of the time data.

As explained above, the card like electronic equipment according to the present invention can prevent the host data processing device from accessing the timer circuit provided in the timer circuit in order to enhance the security of the contents in the card like electronic equipment Other embodiments of the present invention will be apparent to those skilled in the art from consideration of the specification and practice of the invention disclosed herein. In particular, the invention is applicable to any types of personal computers. It is intended that the specification and examples be considered as exemplary only with a true scope and spirit of the invention being indicated by the following claims.

What is claimed is:

1. A card like electronic device that is detachably connectable to a data processing device, comprising:
    a timer circuit for counting time data;
    a control unit for accessing the timer circuit to read the time data; and
    a nonvolatile memory, including a covered area that can be accessed by the control unit, for storing the time data read by the control unit and control data generated by the control unit based on the time data, and a read-only memory accessible only by the control unit and configured to store a program of a certification process used by the control unit, wherein the data processing device is permitted to access the covered area of the nonvolatile memory only after a successful completion of the certification process between the control unit and the processing device.

2. The card like device according to claim 1, further comprising:

a backup power source for supplying driving power to the timer circuit when the card like electronic device is not connected to the data processing device.

3. The card like electronic device according to claim 1, wherein the control unit reads out time data from the timer circuit when the data processing device sends a request to record contents that are limited to use during a specified time period, and stores the read out time data and the specified time period in the covered area in the nonvolatile memory.

4. The card like electronic device according to claim 1, wherein the control unit executes a certification process according to a predetermined procedure when the card like electronic equipment receives a request for recording contents, the control unit further recording the contents only when the data processing device is judged as an approved device based on the certification process.

5. The card like electronic device according to claim 3, wherein the control unit further judges propriety of usage of the contents by comparing the time data for the recording and the specified time period for the usage, when the data processing device sends a request for reproducing the contents having the specified time period for usage.

6. The card like electronic device according to claim 2, further comprising:

a detector for detecting a residual power capacity of the backup power source, and means for limiting access to the nonvolatile memory for recording and reproducing data when the detector judges that residual power capacity of the backup power source is below a predetermined level for driving the timer circuit.

7. The card like electronic device according to claim 6, wherein the limiting means prohibits access to the covered area in the nonvolatile memory when the detector determines the residual power capacity of the backup power source is below the predetermined level.

* * * * *